United States Patent
Muraki et al.

(10) Patent No.: US 7,716,516 B2
(45) Date of Patent: May 11, 2010

(54) METHOD FOR CONTROLLING OPERATION OF MICROPROCESSOR WHICH PERFORMS DUTY CYCLE CORRECTION PROCESS

(75) Inventors: Yosuke Muraki, Austin, TX (US); Tetsuji Tamura, Tokyo (JP); Iwao Takiguchi, Kanagawa (JP); Makoto Aikawa, Kanagawa (JP); Eskinder Hailu, Austin, TX (US); Byron Lee Krauter, Round Rock, TX (US); Stephen Douglas Weitzel, Round Rock, TX (US); Jieming Qi, Austin, TX (US); Kazuhiko Miki, Round Rock, TX (US); David William Boerstler, Round Rock, TX (US); Gilles Gervais, Austin, TX (US); Kirk David Peterson, Jericho, VT (US); Robert Walter Berry, Jr., Round Rock, TX (US); Sang Hoo Dhong, Austin, TX (US)

(73) Assignees: Sony Computer Entertainment Inc., Tokyo (JP); International Business Machines Corporation, Armonk, NY (US); Toshiba America Electronic Components, Inc., Irvine, CA (US)

( * ) Notice: Subject to any disclaimer, the term of this patent is extended or adjusted under 35 U.S.C. 154(b) by 635 days.

(21) Appl. No.: 11/471,819

(22) Filed: Jun. 21, 2006

(65) Prior Publication Data
US 2007/0300082 A1    Dec. 27, 2007

(51) Int. Cl.
*G06F 1/04*     (2006.01)
*G06F 1/24*     (2006.01)
*G06F 11/00*    (2006.01)

(52) U.S. Cl. .............. 713/503; 713/300; 713/322; 713/500; 713/600

(58) Field of Classification Search ........... 713/300, 713/322, 500, 503, 600
See application file for complete search history.

(56) References Cited

U.S. PATENT DOCUMENTS 4,646,223 A * 2/1987 Sekiguchi ............. 700/1
5,774,704 A * 6/1998 Williams ............... 713/501

(Continued)

FOREIGN PATENT DOCUMENTS

JP          10254425          9/1998

(Continued)

OTHER PUBLICATIONS

Office Action for corresponding Japanese Patent Application No. 2007-163089, dated Jul. 14, 2009.

(Continued)

*Primary Examiner*—Thomas Lee
*Assistant Examiner*—Jaweed A Abbaszadeh
(74) *Attorney, Agent, or Firm*—Matthew B. Dernier, Esq.; Gibson & Dernier LLP

(57) ABSTRACT

A technology for supplying a power supply voltage to a microprocessor. Before normal arithmetic processing of the microprocessor, duty cycle correction process for adjusting the duty cycle of a clock signal inside the microprocessor is performed. In the duty cycle correction process for adjusting the duty cycle, the duty cycle of the clock signal is adjusted so as to minimize the power voltage at which the microprocessor is still operable.

20 Claims, 7 Drawing Sheets

U.S. PATENT DOCUMENTS

| | | | |
|---|---|---|---|
| 6,424,178 B1 * | 7/2002 | Harrison | 326/93 |
| 6,535,986 B1 | 3/2003 | Rosno | |
| 7,054,787 B2 * | 5/2006 | Gauthier et al. | 702/183 |
| 7,142,996 B2 | 11/2006 | Patel et al. | |
| 7,233,186 B2 | 6/2007 | Koichi | |
| 7,392,413 B2 * | 6/2008 | Shikata | 713/321 |
| 2003/0126475 A1 * | 7/2003 | Bodas | 713/300 |
| 2004/0232967 A1 | 11/2004 | Koichi | |
| 2005/0043909 A1 * | 2/2005 | Poirier et al. | 702/65 |
| 2005/0107967 A1 | 5/2005 | Patel et al. | |

FOREIGN PATENT DOCUMENTS

| | | |
|---|---|---|
| JP | 2001-167579 | 6/2001 |
| JP | 2001-318730 A | 11/2001 |
| JP | 2004-348573 A | 12/2004 |
| JP | 2005-149476 A | 6/2005 |

OTHER PUBLICATIONS

Office Action for corresponding Japanese Patent Application No. 2007-163089, dated Nov. 10, 2009.

* cited by examiner

METHOD FOR CONTROLLING OPERATION OF MICROPROCESSOR WHICH PERFORMS DUTY CYCLE CORRECTION PROCESS

BACKGROUND OF THE INVENTION

The invention relates to a technology for supplying a power supply voltage to a microprocessor such as a CPU.

Microprocessors include various devices such as CPUs installed in personal computers, workstations, game consoles, and the like. These microprocessors are provided with predetermined power voltages that are stabilized by voltage regulator circuits (hereinafter, referred to as voltage regulator circuits or regulator circuits). The power voltage supplied to a microprocessor is dependent on factors such as the microprocessor semiconductor manufacturing process. Microprocessors made with recently developed low-voltage processes require power voltages of approximately 1.2 only.

A number of vendors are currently offering a variety of such microprocessors. The microprocessors offered by these vendors instruct regulator circuits as to the level of power voltage required, by use of respective proprietary systems. Accordingly, regulator circuits are designed to accept instructions on power voltages from microprocessors. FIG. 7 shows a block diagram illustrating the configuration of a conventional microprocessor and regulator circuit.

As shown in FIG. 7, a microprocessor 60 and a regulator circuit 62 are connected to each other, for example, by five bits of signal lines 64 in parallel. The microprocessor 60 transmits a VID (Voltage ID) signal through the signal lines 64, which indicates to the regulator circuit 62 the level of power voltage Vdd required. The regulator circuit 62 generates the power voltage Vdd indicated by the microprocessor 60, and supplies this voltage to the microprocessor 60 through a power supply line 66. If, for example, the microprocessor 60 is replaced by a user in the apparatus incorporating the microprocessor 60 and the regulator circuit 62 (hereinafter, also referred to simply as a set), given that the new microprocessor 60 indicates the level of power required, it should still be possible to supply the optimum power voltage Vdd to the new microprocessor 60.

However, using conventional techniques, the VIDs of microprocessors 60 cannot be changed once they are fixed at the time when the microprocessor is manufactured as a set. Consequently, the power voltage supplied to a certain microprocessor will remain unchanged regardless of factors after shipment such as the amount of time that the apparatus is used.

In consideration of such post-shipment variations, microprocessor manufacturing vendors allow for possible worst case situations when they determine the power voltages or VIDs. Variations considered include long term changes in the microprocessor function, operating frequency, voltage drop occurring in the incorporated sets, and temperatures during use. This results in the microprocessors being provided with power supply voltages higher than that required to operate the microprocessors. Therefore, to reduce the power consumption of the microprocessors, it is desirable to set optimum power voltages according to the conditions of use of the microprocessor(s).

SUMMARY OF THE INVENTION

The present invention has been devised to address the above problem. It is therefore a general purpose of the present invention to enable the level of power voltage required by a microprocessor to be lowered.

One embodiment of the present invention for solving the foregoing problem relates to a method for controlling the operation of a microprocessor, and an arithmetic processing unit and a microprocessor which use the controlling method. In this technology, duty cycle correction process for adjusting a duty cycle of a clock signal inside a microprocessor is performed before normal arithmetic processing of the microprocessor. This duty cycle correction process is preferably carried out when the microprocessor is mounted on a final target set (an electronic apparatus), i.e., during actual operation.

The lower limit of the power voltage at which the microprocessor is still operable varies according to the duty cycle of the clock signal. One of the aims of the method is to cause the microprocessor to operate at a lower voltage than via conventional methods. This is preferably achieved by adjusting the duty cycle in a dynamic manner while the microprocessor is in its actual operating mode, whereby the duty cycle is preferably optimized to the requirements of the microprocessor at that moment.

It is to be noted that any arbitrary combination or rearrangement of the above-described structural components and so forth are all effective as and encompassed by the present embodiments.

Moreover, this summary of the invention does not necessarily describe all necessary features, so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

The technical concepts of the present invention are achieved by the following various aspects. Initially, an overview will be given of those aspects.

The duty cycle of the clock signal to be used inside a microprocessor is optimized by the process called duty cycle correction (DCC). Since the duty cycle of the clock signal has an effect on the setup times and hold times of logic gates in the microprocessor, optimization through duty cycle correction can enhance the processing power of the microprocessor.

Here, as far as this specification document is concerned, the lower limit of the power voltage Vdd at which the microprocessor is operable (a minimum secure operating voltage; hereinafter, referred to simply as secure operating voltage Vop) correlates with the processing power of the microprocessor. The higher throughput the internal logic gates allow, the lower the secure operating voltage Vop tends to be. This means that by using duty cycle correction, the duty cycle of the clock signal can be optimized to lower the secure operating voltage Vop of the microprocessor.

Figure 1:
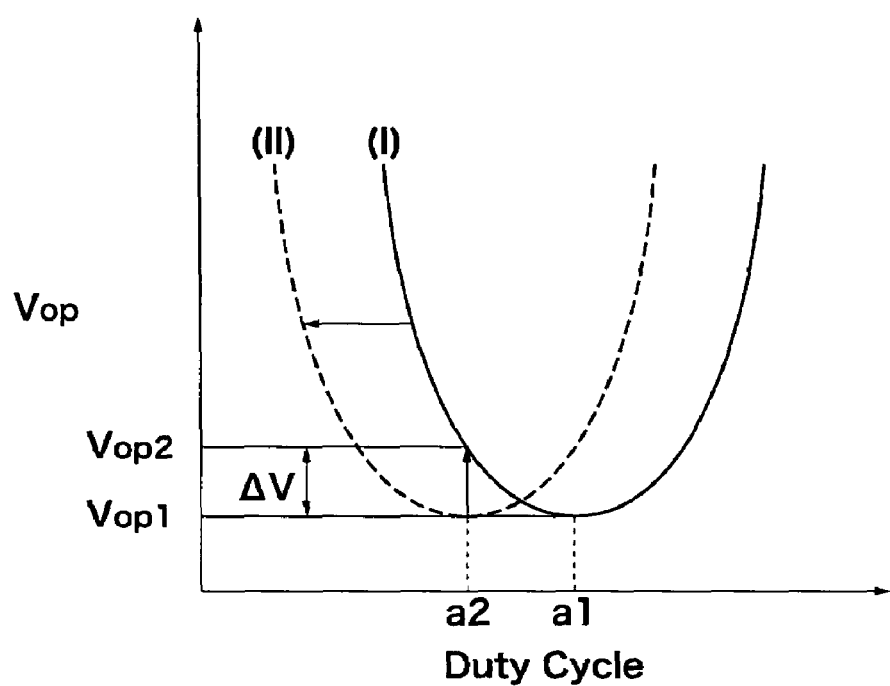
FIG. 1 is a diagram showing the relationship between the duty cycle of a clock signal inside a microprocessor and the secure operating voltage of the microprocessor.

FIG. 1 shows the relationship between the duty cycle of the clock signal inside the microprocessor (x-axis) and the secure operating voltage Vop of the microprocessor (y-axis). The solid line (I) of FIG. 1 shows that the secure operating voltage Vop reaches a minimum value when the duty cycle has an optimum value a1, and the secure operating voltage Vop increases with distance from that point. Note that FIG. 1 shows the y-axis and x-axis as appropriately scaled up or down for ease of understanding. The curves are also drawn in simplified form for ease in understanding of the property demonstrated.

Here, the curves shown in FIG. 1 vary depending on the conditions of use of the microprocessor, such as the number of power-on hours accumulated by the microprocessor post manufacture (POH; also referred to as ON hours). In FIG. 1, the solid line (I) represents an initial state (where the ON hours are zero). The broken line (II) represents the state after a period of time. A comparison between the solid line (I) and the broken line (II) of FIG. 1 shows that the optimum duty cycle for minimizing the secure operating voltage Vop varies (a1→a2) depends on the condition of use of the microprocessor. Several microprocessors designed with silicon semiconductor processes were tested for variations in the optimum duty cycle with respect to power-on hours. The measurements showed that the optimum duty cycle tended to decrease with increasing power-on hours.

If the duty cycle of the clock signal of a microprocessor is fixed to a constant value (=a1) regardless of the conditions of use of the microprocessor, the secure operating voltage Vop has a value of Vop1 in an initial state, and Vop2 after a certain time. Therefore, it should be appreciated that when the microprocessor is shipped with a fixed duty cycle, the predetermined power voltage supplied to the microprocessor, considering long term changes, must be set to a value at least higher than Vop2. In practice, this results in the microprocessor post manufacture being supplied with Vop2, including an additional potential difference ΔVop. However, the microprocessor need only be supplied with the voltage Vop1. The resulting potential difference ΔVop is in effect an unnecessary voltage margin resulting in excessive power consumption.

A challenge to the technology of setting the power voltage of the microprocessor according to the embodiment to be described below is to eliminate any such unnecessary voltage margin and operate the microprocessor stably at a lower power voltage.

One of the aspects of the present invention relates to a method for controlling operation of a microprocessor. This method includes performing duty cycle correction processing which adjusts the duty cycle of a clock signal inside the microprocessor prior to normal arithmetic processing of the microprocessor.

According to this aspect of the invention, even when the relationship between the duty cycle of the clock signal and the secure operating voltage Vop varies with the state of the microprocessor, as shown in FIG. 1, the duty cycle of the clock signal is optimized by the duty cycle correction process. This can eliminate the need to add an unnecessary voltage margin to the power voltage, thereby lowering the operating voltage and achieving reduced power consumption.

The duty cycle correction process may include adjusting the duty cycle of the clock signal so as to minimize the power supply voltage at which the microprocessor is operable. The duty cycle correction process may also be performed at certain predetermined times. The duty cycle correction process may be performed by a built in self-test (BIST) function which is built into the microprocessor itself or which is inside an electronic apparatus on which the microprocessor is mounted.

The duty cycle correction process may include: changing the duty cycle of the clock signal sequentially while supplying a predetermined power voltage to the microprocessor and causing it to execute predetermined processes; determining whether or not the microprocessor can execute the predetermined processes at each variation of the duty cycle; and setting an executable duty cycle as a final duty cycle.

The duty cycle of the clock signal to be adjusted may be that of a clock signal intended for memory access.

According to another aspect of the invention, the method for controlling the operation of the microprocessor may also perform voltage setting processes which re-set the predetermined power voltage supplied to the microprocessor after the duty cycle correction process is completed.

The voltage setting process may include: changing the power voltage supplied to the microprocessor while causing the microprocessor to execute predetermined processes by using the duty cycle adjusted by the duty cycle correction process; determining whether or not the microprocessor can execute the predetermined process at each variation of the power voltage; and setting one of the executable power supply voltages close to a minimum value as the power voltage to be supplied to the microprocessor.

Another aspect of the present invention provides an arithmetic processing unit. This arithmetic processing unit preferably comprises: a microprocessor; an adjustment unit which adjusts the duty cycle of a clock signal inside the microprocessor; and a power circuit which supplies a power voltage to the microprocessor. The adjustment unit adjusts the duty cycle before the power supply circuit supplies the power supply voltage. The adjustment unit may be built into the microprocessor.

Another aspect of the present invention provides a microprocessor. This microprocessor adjusts by itself a duty cycle of a clock signal inside while being supplied with a predetermined power voltage, thereby detecting a value of the duty cycle at which it is operable on the predetermined power voltage.

According to this aspect, it is possible to optimize the duty cycle by use of the microprocessor alone.

Another aspect of the present invention provides a program for supplying a power voltage to a microprocessor. This program causes an arithmetic processing unit incorporating a microprocessor to execute: adjustment of a duty cycle of a clock signal inside the microprocessor; and supply of a power voltage to the microprocessor in accordance with the duty cycle adjusted in the adjustment step.

It should be appreciated that any combinations of the foregoing components, and any conversions of expressions of the present invention from/into methods, apparatuses, systems, programs, and recording media containing the same are also intended to constitute applicable aspects of the present invention.

Hereinafter, an arithmetic processing unit according to one embodiment of the present invention will be described in detail with reference to the drawings.

Figure 2:
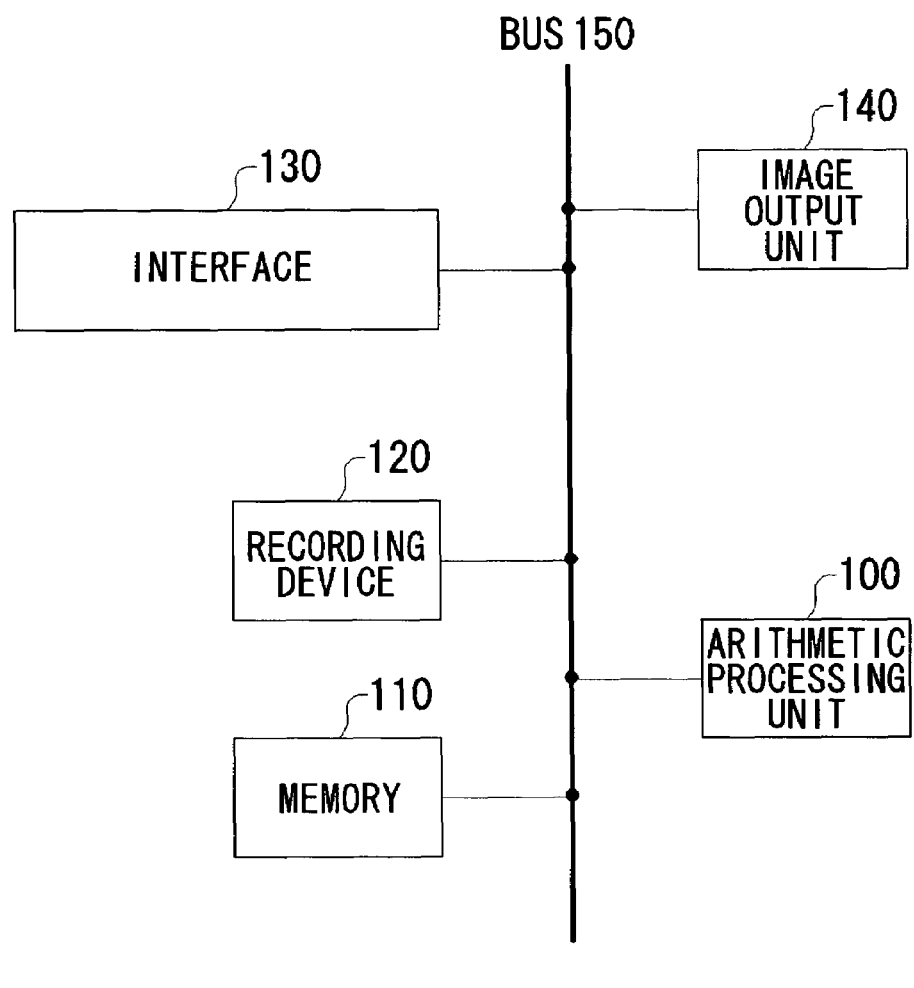
FIG. 2 is a block diagram showing the configuration of an electronic apparatus according to an embodiment.

FIG. 2 shows a block diagram illustrating the configuration of an electronic apparatus 1000 according to the embodiment. Examples of the electronic apparatus 1000 include a game console, a personal computer, a workstation, and a PDA. The following description describes an embodiment where the electronic apparatus 1000 is a game console, although the present invention is not limited thereto.

This electronic apparatus 1000 comprises an arithmetic processing unit 100, a memory 110, a recording device 120, an interface 130, an image output unit 140, and a bus 150.

The arithmetic processing unit 100 is a unit which contains a CPU, a graphic processor, and other components, for example, and executes predetermined digital arithmetic processes. The CPU is a unit for exercising integrated control over the electronic apparatus 1000. The graphic processor is an LSI that is preferably designed for image processing. The CPU and the graphic processor functions may be completed using a single LSI. The graphic processor generates image data that are output and shown on a not shown external image display unit through the image output unit 140. The arithmetic processing unit 100 loads programs and data from the recording device 120 into the memory 110, and performs arithmetic processing.

The recording device 120 is a hard disk drive, a DVD drive, or similar device, and contains programs to be run on the apparatus. The interface 130 is a USB port, a modem, a wireless LAN (Local Area Network) unit, or similar device. The interface 130 is used to access external apparatuses and external networks such as the Internet. The individual blocks are connected by means of the bus 150.

The arithmetic processing unit 100 according to the present embodiment may be used in the electronic apparatus 1000 described above. Preferably, the arithmetic processing unit 100 is best suited for use in apparatuses with high power consumption. The arithmetic processing unit 100 will now be described in detail.

Figure 3:
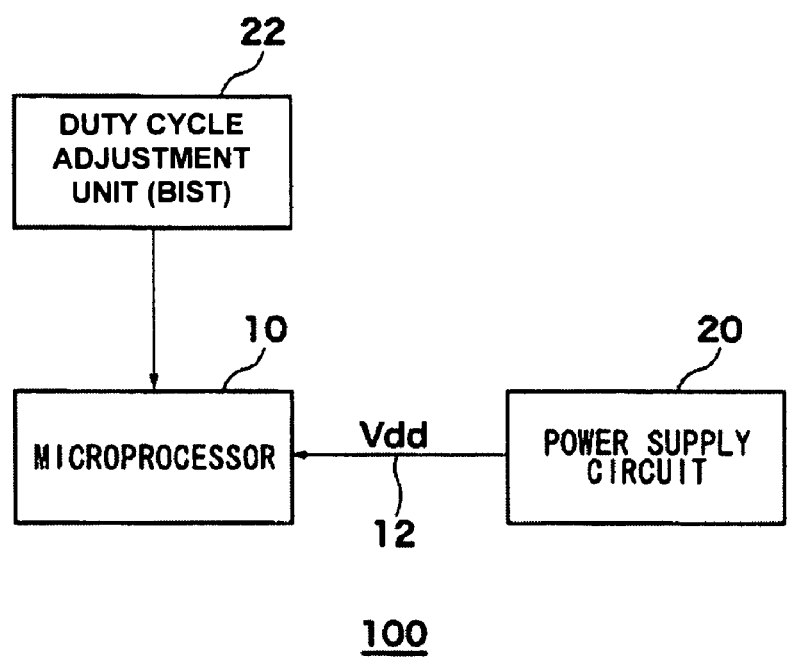
FIG. 3 is a block diagram showing the configuration of an arithmetic processing unit according to the embodiment.

FIG. 3 shows a block diagram illustrating the configuration of the arithmetic processing unit 100 according to the embodiment. The arithmetic processing unit 100 contains: a microprocessor 10 such as a CPU and a graphic processor; a power supply circuit 20 which supplies a power voltage Vdd to the microprocessor 10; and a duty cycle adjustment unit 22.

The blocks described above are only divided into separate parts to assist in understanding the invention. In terms of hardware, the components shown in the diagram as respective functional blocks for performing various processing may be composed of a CPU, a memory, and other LSIs. In terms of software, the blocks may be contained within programs or similar algorithms loaded into a memory. It should be understood by those skilled in the art that these functional blocks may be achieved in various forms including hardware alone, software alone, and a combination of these forms, and not limited to any one of them.

The microprocessor 10 and the power supply circuit 20 are connected via a power supply line 12. In the following diagrams, like or identical components are designated by the same numerals. Description thereof is omitted as appropriate. The power supply circuit 20 is a regulator circuit or the like, and supplies the predetermined power voltage Vdd to the microprocessor 10. In one example, the power supply voltage Vdd may have a value of approximately 1.2 V.

The duty cycle adjustment unit 22 performs the duty cycle correction process (DCC process) for adjusting the duty cycle of a clock signal CK inside the microprocessor 10. This DCC process is performed before normal arithmetic processing of the microprocessor 10. For example, the DCC process may be performed at certain predetermined times. Examples of such predetermined times might include when the electronic apparatus 1000 is started up, when the electronic apparatus 1000 is not being used, such as overnight, or at other times determined by users in advance.

The functions of the duty cycle adjustment unit 22 may be achieved by the microprocessor 10 itself or through BIST functions that are built into the arithmetic processing unit 100. In this case, the arithmetic processing unit 100 can adjust the duty cycle independent of external units. The microprocessor incorporating the functions of the duty cycle adjustment unit 22 adjusts by itself the duty cycle of the clock signal inside while being supplied with a predetermined power voltage. The microprocessor thereby detects a value of the duty cycle at which it is operable on the predetermined power voltage.

By DCC processing, the duty cycle adjustment unit 22 optimally adjusts the duty cycle of the clock signal so as to minimize the secure operating voltage Vop at which the microprocessor 10 is still operable.

In this embodiment, the duty cycle of the clock signal to be adjusted is that of a clock signal intended for accessing memories (such as an SRAM array), for example. Since SRAMs operate with both rising and falling edges of the clock, the duty cycle can be adjusted to significantly vary the secure operating voltage Vop. With SRAMs, the amount of adjustment to the duty cycle may vary from several picoseconds to several tens of picoseconds.

In an alternative embodiment, when internal logic units of the microprocessor 10 for executing arithmetic processes are designed and implemented with asynchronous logics, it is possible to change the secure operating voltage by adjusting the duty cycle in the order of values from several hundreds of picoseconds to several nanoseconds. The duty cycle of the clock signal may then be adjusted for either the memory array or the logic array. If the microprocessor is configured so that power voltages can be supplied to the memory array and the logic array separately, the duty cycles of the clock signals of both may be adjusted.

As described above, the optimum duty cycle for minimizing the value of the secure operating voltage Vop varies depending on the conditions of use of the microprocessor 10. According to the arithmetic processing unit 100 of the present embodiment, the duty cycle of the clock signal can be adjusted and optimized to lower the voltage necessary for the operation of the microprocessor. This consequently increases the number of microprocessors that are operable at a certain power voltage, with an improvement to the yield.

Hereinafter, descriptions will be given of specific examples of DCC processing.

FIRST EXAMPLE

In a first example, the duty cycle of the clock signal is changed sequentially while the microprocessor 10 is operated to execute a predetermined process. The ability of the microprocessor to execute the predetermined process or not is determined at each variation of the duty cycle, and an executable duty cycle is set as a final duty cycle, i.e., one for use in normal arithmetic processing. This DCC process assumes that the power voltage Vdd supplied from the power circuit 20 to the microprocessor 10 is set to a value close to the voltage value Vop1 of FIG. 1, i.e., the minimum value of the curves (I) and (II).

Figure 4:
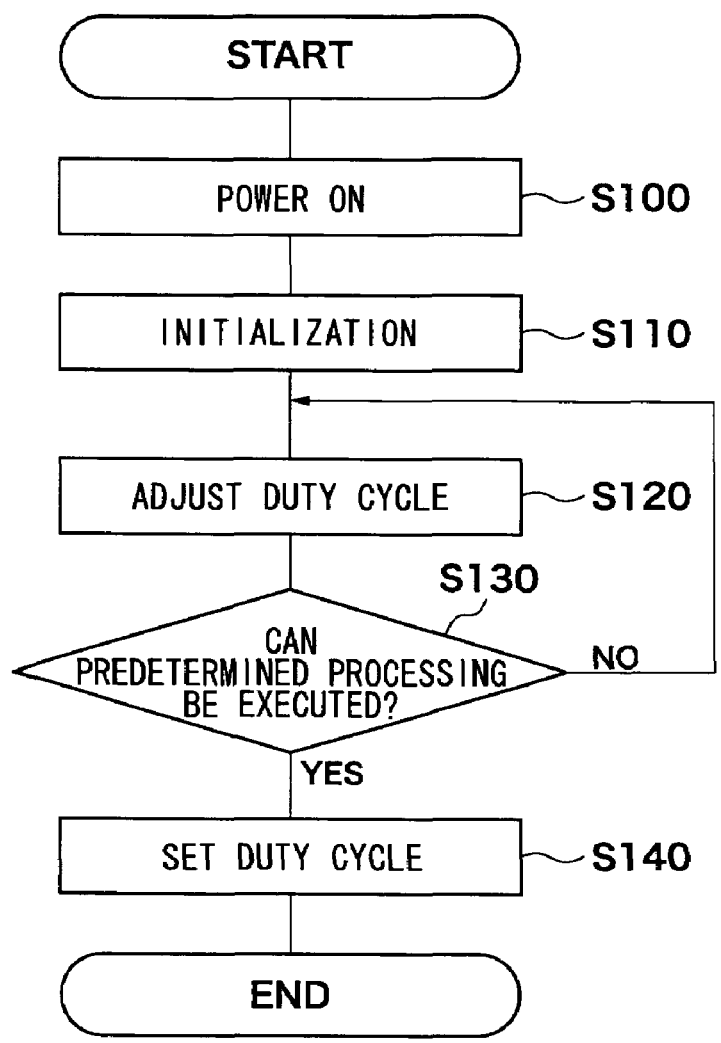
FIG. 4 is a flowchart of DCC processing according to a first example.

FIG. 4 shows a flowchart illustrating DCC processing according to the first example. As shown in FIG. 4, the arithmetic processing unit 100 starts a self diagnosis test at a predetermined time such as when powered on (S100), and initializes the entire system (S110). Here, the power voltage is set to an initial value Vinit.

At the next step S120, the duty cycle is set to a defined value. At next step S130, it is established whether a predetermined process can be executed or not. If the predetermined process can be executed (Y at S130), the value of the duty cycle at that point is set as the final duty cycle (S140). After the setting of the duty cycle (S140), the arithmetic processing unit 100 ends DCC processing, and starts normal arithmetic processing.

If the predetermined processing cannot be executed (N at S130), the duty cycle is set to a different value (S120), and the determination step is repeated (S130). Steps S120 and S130 are repeated to sweep the value of the duty cycle.

When the ON hours POH of the microprocessor 10 are close to 0, the microprocessor 10 has the characteristic defined approximately by the solid line (I) shown in FIG. 1. As described above, the power voltage to be supplied to the microprocessor 10 is fixed to the predetermined value Vop1. Therefore, the microprocessor 10 can execute the predetermined process only if the duty cycle is in the vicinity of a1. When the microprocessor 10 has been used over time and has shifted to the characteristic defined approximately by the dashed line (II) of FIG. 1, the microprocessor 10 can execute the predetermined process only if the duty cycle is in the vicinity of a2.

In this example, the DCC process repeats steps S120 and S130 to sweep all values within the duty cycle. An optimum duty cycle can therefore be detected no matter what state the microprocessor 10 is in, i.e., no matter where the curve is traced in FIG. 1. This makes it possible to set the minimum value of the secure operating voltage Vop as the power voltage in the design phase of the arithmetic processing unit 100, thereby achieving a reduction in power consumption. More specifically, due to the fixed duty cycle (a1), it has conventionally been necessary to set the power voltage supplied to the microprocessor 10 to the voltage value Vop2, considering the worst case scenarios. In contrast, according to this example, it is sufficient to set the voltage value to Vop1. Using the method described above, the power supply voltage can therefore be lowered by ΔVop=Vop2−Vop1.

Moreover, the reduced power consumption can improve the long-term reliability of the microprocessor 10. The amount of heat generated from the microprocessor 10 may also decrease with a further secondary effect being reduced noise from a cooling fan.

In an alternative embodiment, the optimum duty cycle obtained from the execution of the DCC process may be stored into a memory or the like for use as an initial value of the duty cycle when performing the DCC process the next time the apparatus is used. Since the curve of FIG. 1 does not change rapidly, the use of the previous duty cycle for determination can decrease the amount of sweep of the duty cycle and reduce the time necessary for DCC processing.

The power voltage to be supplied to the microprocessor may also be determined by the following technique. Initially, the characteristic shown in FIG. 1 is acquired by performing an accelerated test or the like during the design phase of the microprocessor. As a result, a plurality of curves may be obtained according to the number of microprocessor ON hours. For example, FIG. 1 shows two curves (I) and (II) corresponding to two ON hours. Minimum values are read from the plurality of obtained curves, respectively. In FIG. 1, both curves have a minimum value of Vop1. In actual microprocessors, minimum values may differ from one curve to another. Among the minimum values of the respective curves, the maximum one is set as the power voltage to be supplied to the microprocessor.

In an alternative embodiment, the plurality of curves may be obtained not only by using the ON hours of the microprocessor as a parameter, but also with any one or a combination of various parameters that might influence the required power voltage, such as the temperature of the microprocessor 10 and the type of arithmetic processing to be executed.

It should be understood that the method of setting the power voltage is not limited thereto. The power voltage can be set as low as possible, provided that the duty cycle of the clock signal is optimized before the microprocessor is put into operation. As a consequence, it is possible to lower the set value of the power voltage compared to the cases where the duty cycle is fixed.

SECOND EXAMPLE

Figure 5:
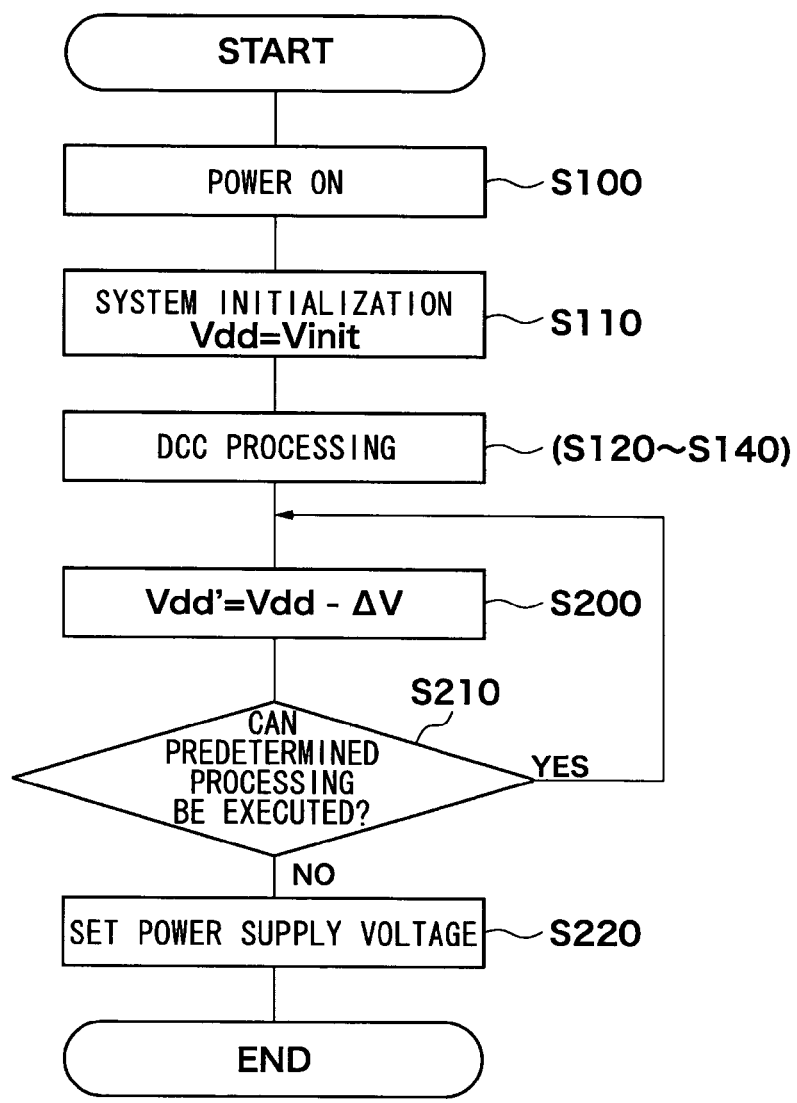
FIG. 5 is a flowchart of the DCC processing according to a second example.

The first example deals with processing in which only the duty cycle is changed while the power voltage Vdd is fixed in advance in the design phase of the microprocessor, or electronic apparatus. In contrast, the second example deals with the case where DCC process is followed by re-setting of the power voltage Vdd further, thereby adjusting the power voltage actively. FIG. 5 shows a flowchart of the DCC process according to the second example.

FIG. 5 shows the DCC process (S120 to S140) of FIG. 4 in a simplified form because the process is the same as in FIG. 3. In the second example, processing to set the power voltage is performed at steps S200 to S220 after DCC processing (S120 to S140).

In these voltage setting processes (S200 to S220), the microprocessor 10 is operated to execute predetermined processing by using a duty cycle set by DCC processing. In this state, the power voltage supplied to the microprocessor 10 is changed, and whether or not the microprocessor 10 can execute the predetermined processing is determined with respect to each variation in the power voltage. As a result, a voltage close to the minimum value, among the power voltages at which predetermined processing can be executed, is set as the power voltage to be supplied to the microprocessor.

For example, at step S200, the power voltage Vdd is lowered by ΔV from the previous power voltage. Next, whether or not predetermined processing can be executed is determined (S210). Then, if the predetermined processing can be executed (Y at S210), the flow returns to step S200 to lower the power voltage further by ΔV.

If steps S210 and S200 are repeated until the power voltage Vdd falls below the secure operating voltage, predetermined processing is no longer executable (N at S210). As a result of the series of processes, it is possible to estimate the lower limit of the power supply voltage at which the microprocessor 10 is operable. At step S220, a voltage in the vicinity of the lower limit estimated is set as the power voltage to be supplied to the microprocessor 10.

According to the second example, the power voltage is re-set after adjustment of the duty cycle. Since the power voltage can therefore be changed in accordance with actual conditions when the microprocessor performs arithmetic processing, a further reduction in power consumption can be made as compared to the case in which the power voltage is set in advance.

THIRD EXAMPLE

Figure 6:
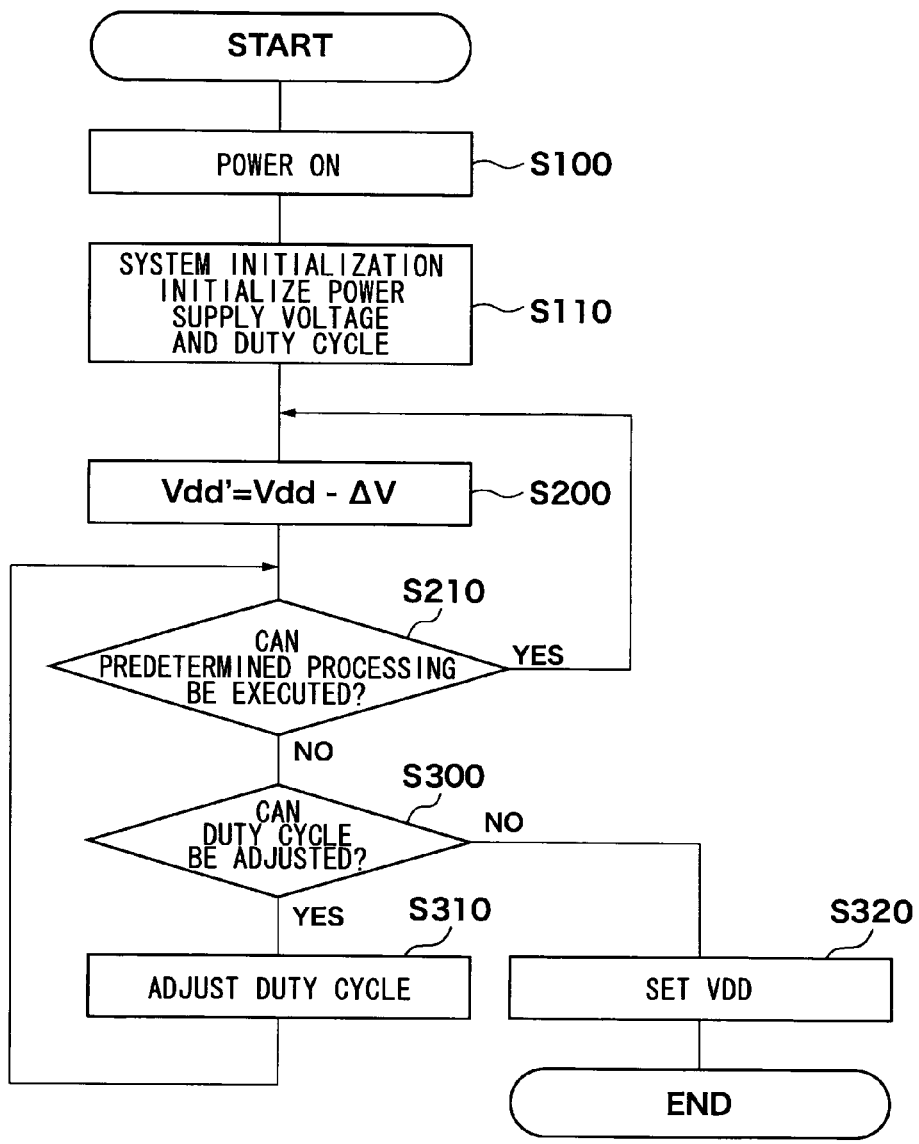
FIG. 6 is a flowchart of the DCC processing according to a third example.
Figure 7:
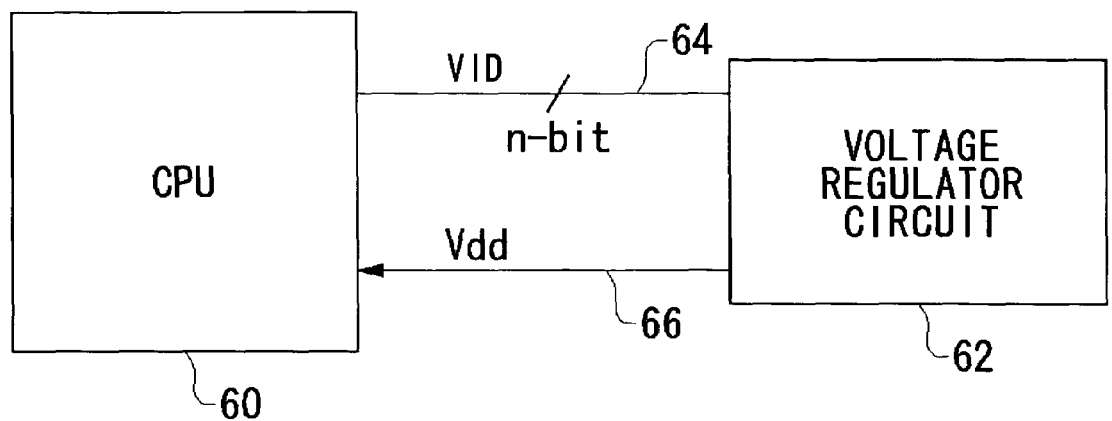
FIG. 7 is a block diagram showing the exemplary configuration of a conventional microprocessor and regulator circuit.

As a modification of the second example, the minimum value of the power voltage required for the microprocessor 10 may be searched for by sweeping the duty cycle and the power voltage in a matrix fashion. FIG. 6 shows a flowchart of DCC processing according to a third example.

In FIG. 6, the power supply is turned on (S100), and the system is initialized (S110). During this system initialization, the power voltage Vdd is initialized and the duty cycle is also initialized. Next, at step S200, the power voltage Vdd is lowered by ΔV from the previous power voltage. Next, it is determined whether or not predetermined processing can be executed (S210). Then, if predetermined processing can be executed (Y at S210), the flow returns to step S200 to lower the power supply voltage further by ΔV.

Alternatively, if predetermined processing cannot be executed at step S210(N at S210), the flow proceeds to step S300 to determine whether or not the duty cycle can be adjusted (S300). If the duty cycle can be adjusted at step S300 (Y at S300), the duty cycle is adjusted (S310).

After the adjustment of the duty cycle, the flow returns to step S210 to determine whether or not the predetermined processing can again be executed. If it can be executed (Y at S210), the power voltage is set to a lower value (S200).

Therefore, as long as predetermined processing can be executed, the power voltage is gradually lowered by the processing loop of steps S200 and S210. If predetermined processing is no longer possible at a certain point, the duty cycle is adjusted again and the determination process is repeated, so that the flow again enters the processing loop of steps S200 and S210. As a result, both the duty cycle and the power voltage are optimized in a gradual manner.

If the duty cycle cannot be adjusted at step S300 (N at S300), it is determined that a lowest power voltage be set with an optimum duty cycle value. Then, the lowest value of all the power voltages Vdd at which the predetermined process can be executed is set as the final power voltage, and the duty cycle is set (S320) before the flow ends. By way of this series of processes, it is possible to estimate the lower limit of the power voltage at which the microprocessor 10 is operable.

The present invention has been described above in conjunction with the specific embodiments. The specific embodiments are provided by way of illustration only. It should be understood by those skilled in the art that various modifications may be made to combinations of the foregoing components and processes, and all such modifications are also intended to fall within the scope of the present invention.

As described above, FIG. 1 illustrates an example of the relationship between the duty cycle of the clock signal inside the microprocessor and the secure operating voltage Vop of the microprocessor. The side to which the curve of the secure operating voltage Vop shifts as a result of long term changes, (whether to the right or to the left), is dependent on factors such as the microprocessor manufacturing process and circuit configuration of the microprocessor. It should be appreciated that the present invention may be applied whichever direction the curve shifts.

While the preferred embodiments of the present invention have been described using specific terms, such description is for illustrative purposes only, and it is to be understood that changes and variations may be made without departing from the spirit or scope of the appended claims.

What is claimed is:

1. A method for controlling operation of a microprocessor, comprising performing duty cycle correction process which adjusts a duty cycle of a clock signal used inside the microprocessor where both rising and falling edges of the clock signal are used for memory access, before normal arithmetic processing of the microprocessor such that a power voltage at which the microprocessor is operable is lowered, wherein the power voltage at which the microprocessor is operable has a dependency on the duty cycle of the clock signal.

2. The method according to claim 1, wherein the duty cycle correction process comprises adjusting the duty cycle of the clock signal so as to minimize the power voltage at which the microprocessor is operable.

3. The method according to claim 1, wherein the duty cycle correction process is performed at certain predetermined times.

4. The method according to claim 2, wherein the duty cycle correction process is performed at certain predetermined times.

5. The method according to claim 1, wherein the duty cycle correction process is performed by a built-in self-test function which is built into the microprocessor itself or within an electronic apparatus on which the microprocessor is mounted.

6. The method according to claim 2, wherein the duty cycle correction process is performed by a built-in self-test function which is built into the microprocessor itself or within an electronic apparatus on which the microprocessor is mounted.

7. The method according to claim 1, wherein
the duty cycle correction process comprises:
changing the duty cycle of the clock signal sequentially while supplying a predetermined power voltage to the microprocessor and causing the microprocessor to execute predetermined processes;
determining whether or not the microprocessor can execute the predetermined processing at each variation of the duty cycle; and
setting an executable duty cycle as a final duty cycle.

8. The method according to claim 2, wherein
the duty cycle correction process comprises:
changing the duty cycle of the clock signal sequentially while supplying a predetermined power voltage to the microprocessor and causing the microprocessor to execute predetermined processes;
determining whether or not the microprocessor can execute predetermined processing at each variation of the duty cycle; and
setting an executable duty cycle as a final duty cycle.

9. The method according to claim 1, wherein the duty cycle is that of a clock signal intended for memory access.

10. The method according to claim 2, wherein the duty cycle is that of a clock signal intended for memory access.

11. The method according to claim 1, comprising performing voltage setting process which re-sets the power supply voltage to be supplied to the microprocessor after the duty cycle correction process is completed.

12. The method according to claim 2, comprising performing voltage setting process which re-sets the power supply voltage to be supplied to the microprocessor after the duty cycle correction process is completed.

13. The method according to claim 11, wherein
the voltage setting process comprises:
changing the power supply voltage supplied to the microprocessor while causing the microprocessor to execute predetermined processes by using the duty cycle adjusted by the duty cycle correction process;
determining whether or not the microprocessor can execute predetermined processes at each variation of the power supply voltage; and
setting one of executable power voltages close to a minimum value as the power voltage to be supplied to the microprocessor.

14. The method according to claim 12, wherein the voltage setting process comprises:

changing the power supply voltage supplied to the microprocessor while causing the microprocessor to execute predetermined processes by using the duty cycle adjusted by the duty cycle correction process;

determining whether or not the microprocessor can execute predetermined processes at each variation of the power supply voltage; and setting one of executable power supply voltages close to a minimum value as the power voltage to be supplied to the microprocessor.

15. An arithmetic processing unit comprising:

a microprocessor;

an adjustment unit which adjusts a duty cycle of a clock signal used inside the microprocessor where both rising and falling edges of the clock signal are used for memory access; and a power supply circuit which supplies a power voltage to the microprocessor, wherein the adjustment unit adjusts the duty cycle before the power supply circuit supplies the power voltage such that the power voltage at which the microprocessor is operable is lowered, and the power voltage at which the microprocessor is operable has a dependency on the duty cycle of the clock signal.

16. The arithmetic processing unit according to claim 15, wherein the adjustment unit adjusts the duty cycle of the clock signal so as to minimize the power voltage at which the microprocessor is operable.

17. The arithmetic processing unit according to claim 15, wherein the adjustment unit is built into the microprocessor.

18. The arithmetic processing unit according to claim 15, wherein the adjustment unit adjusts the duty cycle at certain predetermined times.

19. A microprocessor being configured to perform duty cycle adjustments, comprising:

a duty cycle adjustment device operating to sequentially adjust by itself a duty cycle of a clock signal used inside where both rising and falling edges of the clock signal are used for memory access, while being supplied with a predetermined power voltage, and detect at least one value of the duty cycle that lowers the power voltage at which the microprocessor is operable, wherein the power voltage at which the microprocessor is operable has a dependency on the duty cycle of the clock signal.

20. A recording medium, readable by a computer, having a program stored thereon for setting a power voltage to be supplied to a microprocessor of the computer, the program causing an arithmetic processing unit incorporating the microprocessor to execute steps comprising:

performing a duty correction process comprising adjusting a duty cycle of a clock signal used inside the microprocessor where both rising and falling edges of the clock signal are used for memory access, before normal arithmetic processing of the microprocessor such that the power voltage at which the microprocessor is operable is lowered, wherein the power voltage at which the microprocessor is operable has a dependency on the duty cycle of the clock signal.

* * * * *